(12) United States Patent
Rapp et al.

(10) Patent No.: US 6,336,881 B1
(45) Date of Patent: Jan. 8, 2002

(54) CHAIN DRIVE FOR INTERNAL-COMBUSTION ENGINES

(75) Inventors: Hermann Rapp, Eberdingen; Klaus Groeger, Hemmingen, both of (DE)

(73) Assignee: Dr. Ing. h.c.F. Porsche AG, Weissach (DE)

( * ) Notice: Subject to any disclaimer, the term of this patent is extended or adjusted under 35 U.S.C. 154(b) by 0 days.

(21) Appl. No.: 09/399,102

(22) Filed: Sep. 20, 1999

(30) Foreign Application Priority Data

Sep. 18, 1998 (DE) .......................................... 198 42 723

(51) Int. Cl.$^7$ ................................................. F16H 7/08
(52) U.S. Cl. ........................................ 474/111; 474/140
(58) Field of Search .............................. 474/110, 111, 474/117, 133, 135, 138, 140

(56) References Cited

U.S. PATENT DOCUMENTS

| | | | |
|---|---|---|---|
| 4,832,664 A | 5/1989 | Groeger et al. | 474/111 |
| 5,030,169 A | * 7/1991 | Kiso et al. | 474/110 |
| 5,246,404 A | * 9/1993 | Ojima | 474/111 |
| 5,700,214 A | * 12/1997 | Kuznets et al. | 474/110 |
| 5,743,228 A | 4/1998 | Takahashi | 123/195 |
| 6,036,613 A | * 3/2000 | Diehm | 474/111 |

FOREIGN PATENT DOCUMENTS

| | | |
|---|---|---|
| DE | 34 17 100 | 7/1985 |
| DE | 36 23 903 | 10/1987 |
| DE | 37 06 136 | 9/1988 |
| EP | 656 464 | 6/1995 |
| GB | 2143926 | 2/1985 |
| IT | 614237 | * 12/1960 |

OTHER PUBLICATIONS

Copy of European Search Report (EP 99 11 4410) dated Jan. 11, 2000.

* cited by examiner

Primary Examiner—Thomas R. Hannon
Assistant Examiner—Vicky A. Johnson
(74) Attorney, Agent, or Firm—Crowell & Moring LLP

(57) ABSTRACT

A chain drive is used for driving camshafts, secondary shafts or the like, from a crankshaft, in an internal combustion engine. A tensioner blade and a sliding blade rest against the loose end and against the load end of a chain of the chain drive. For compensating component tolerances, the sliding blade and the tensioner blade are each disposed in an articulated manner at a proximal end via a bolt. An adjusting device is applied to a distal end of each of the sliding blade and the tensioner blade, respectively.

26 Claims, 2 Drawing Sheets

CHAIN DRIVE FOR INTERNAL-COMBUSTION ENGINES

BACKGROUND AND SUMMARY OF THE INVENTION

This application claims the priority of German patent 198 42 723.9, filed Sep. 18, 1998, the disclosure of which is expressly incorporated by reference herein.

The invention relates to a chain drive for internal-combustion engines, particularly for driving one or several camshafts, secondary shafts, or the like, on such engines, a tensioner blade or sliding blade being applied to the slack side and to the load side of a chain of the chain drive.

In a chain drive known from German Patent Document DE 36 23 903 C1, a tensioner blade interacts with a load side of the chain by way of a tensioning device. Another blade is constructed as a chain guide for a load side and is fixed with respect to its position.

A comparable construction is disclosed in German Patent Document DE 34 17 100 A1, in which, for compensating manufacturing tolerances of the crankcase, blades of the chain drive are disposed in a floating manner transversely to the longitudinal direction of the chain.

German Patent Document DE 37 06 136 C1 relates to a chain tensioner consisting of a plastic material for guiding and tensioning a chain. This tensioner has a slide coating made of a wear-resistant material and a support made of a bending-resistant material, such a polyamide.

None of the above-mentioned references supplies information as to how normal component tolerances of the chain drive can be compensated with acceptable expenditures particularly with respect to the distance between the sprocket wheels and/or the chain.

It is therefore an object of the invention to provide blades, particularly on the guiding blade and/or the tensioner blade of the chain drive, that can compensate for component tolerances caused either by manufacturing or wear influences without any problem.

This and other objects have been achieved according to the present invention, by providing a chain drive for internal-combustion engines, particularly for driving one or several camshafts, secondary shafts, or the like, on such engines, a tensioner blade or sliding blade being applied to the loose end and to the load end of a chain of the chain drive, characterized in that the tensioner blade and the sliding blade are each disposed in an articulated manner on a first side by means of bolts and one adjusting device respectively is applied to a second side of these blades.

This and other objects have been achieved according to the present invention, by providing a chain drive for an internal-combustion engine, comprising: a chain; a tensioner blade engaging a loose side of said chain; a sliding blade engaging a load side of said chain; said tensioner blade and said sliding blade each being disposed in an articulated manner at a first end; and adjusting devices being applied to second ends of said tensioner blade and said sliding blade, respectively.

The principal advantages achieved by the invention are that, by way of the two adjusting devices, on the one hand, measurement deviations from the design position can be compensated in a simple manner and, on the other hand, a targeted tensioning function is ensured on the chain. In this case, a preadjustment for the reduction of component tolerances of the chain drive takes place by way of the fixing device, whereas the tensioning device essentially covers the actual tensioning range. In the design of the tensioning device and the fixing device, proven principles of machine construction can be used. The receiving section of the fixing device simultaneously promotes the guiding of the sliding blade in its transverse direction.

A spatially favorable construction and bearing of the two blades is achieved in that the bolts are situated outside the chain drive. This also applies to the arrangement of the fixing device; that is, on the chain between the sprocket wheels. The shape of the blades is in each case such that it is composed of oppositely oriented curves and is particularly suitable for a chain drive with two chain sprockets because it can easily be adapted to the given space conditions. The blades finally consist of a suitable plastic material, which has a cost and weight reducing effect.

Other objects, advantages and novel features of the present invention will become apparent from the following detailed description of the invention when considered in conjunction with the accompanying drawings.

DETAILED DESCRIPTION OF THE DRAWINGS

Figure 1:
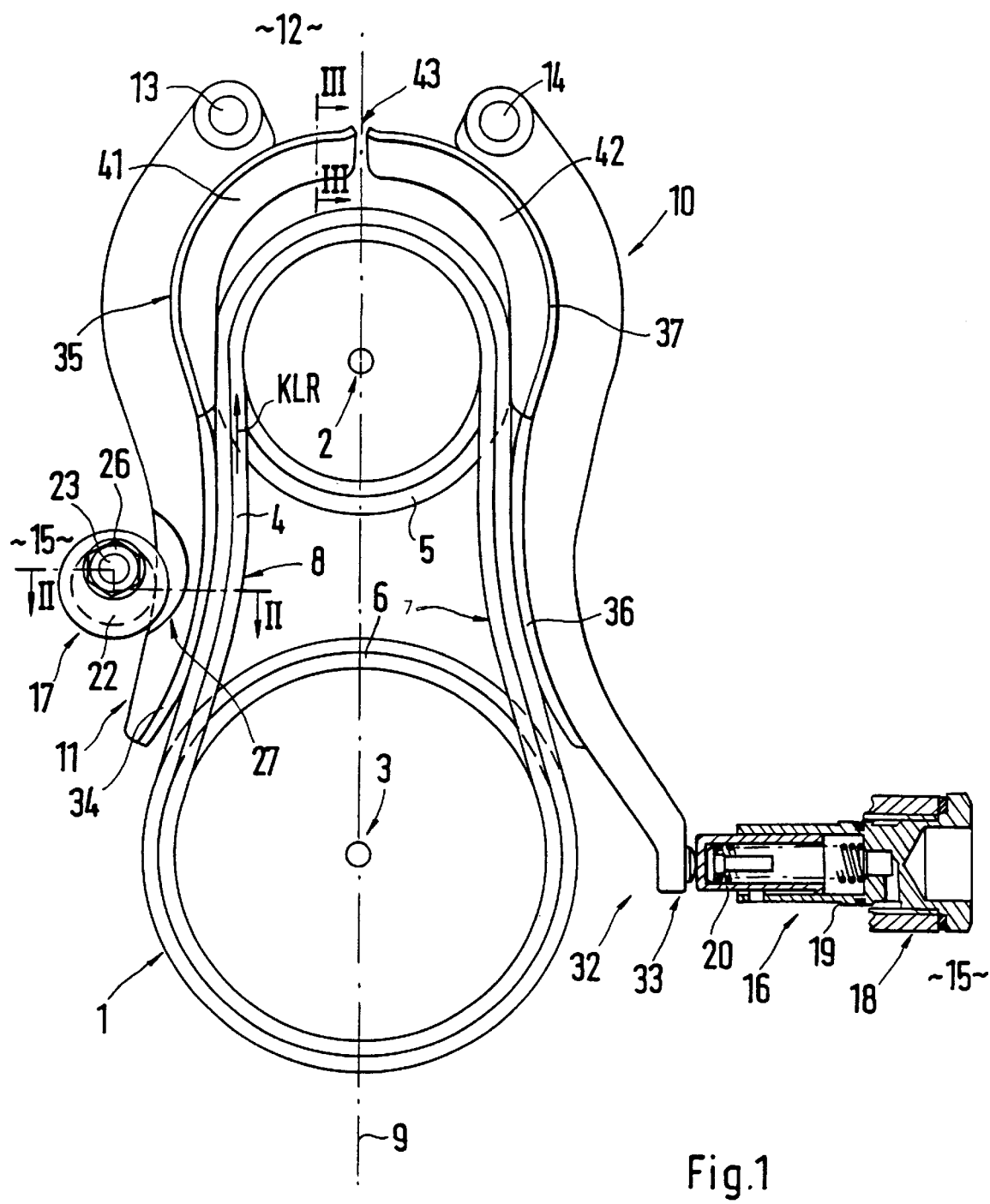
FIG. 1 is a frontal view of a chain drive of an internal-combustion engine.
Figure 2:
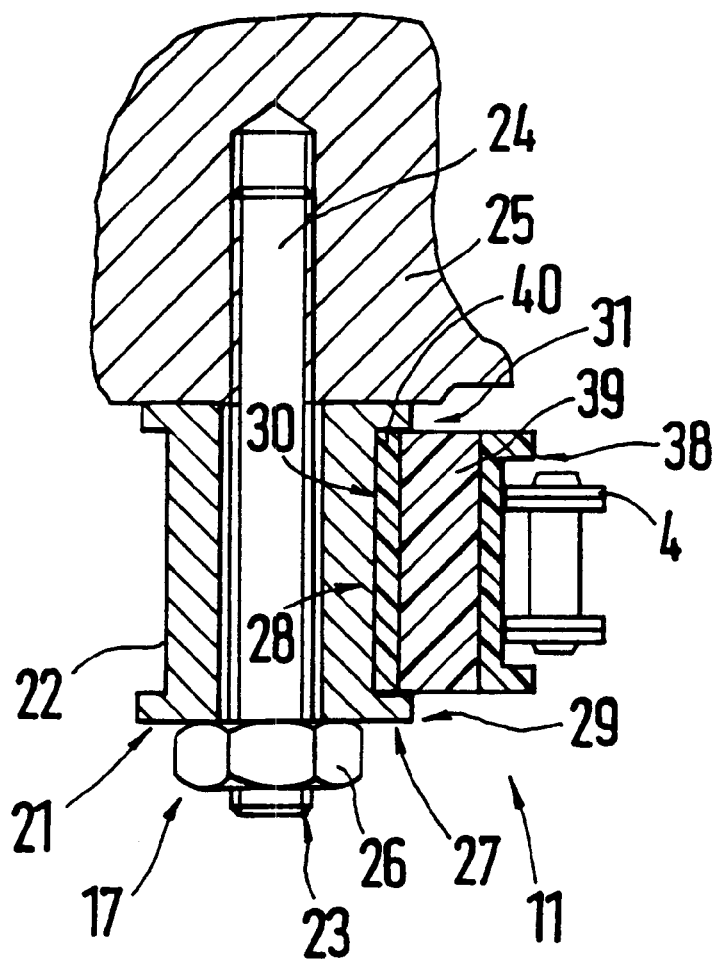
FIG. 2 is a sectional view according to Line II—II of FIG. 1.

Referring to FIG. 1, the chain drive 1 couples a crankshaft 2 and a secondary shaft 3 (e.g., a camshaft) of an internal-combustion engine not illustrated in further detail. The chain drive 1 includes a chain 4 and sprocket wheels 5 and 6. Reference number 7 indicates a loose side and reference number 8 indicates a load side of the chain drive 1. The crankshaft 2 and the secondary shaft 3 are situated on a vertical construction line 9 which, in the illustrated embodiment, includes a longitudinal center line of the internal-combustion engine. In the illustrated embodiment, the secondary shaft 3 is arranged below the crankshaft 2.

A tensioner blade 10 is applied to the loose side 7 of the chain 4. A sliding blade 11 is applied to the load side 8 of the chain 4. The tensioner blade 10 and the sliding blade 11 are each disposed in an articulated manner at a first end 12, specifically above the sprocket wheel 5, via a bolt 13 and 14. Adjusting devices 16, 17 are applied proximate opposite ends of the tensioner blade 10 and the sliding blade 11, respectively. As a result of this construction, the blades 10 and 11 assume a hanging position. The adjusting device 16 of the tensioner blade 10 is a tensioning device 18, which has a stationary cylinder 19 and an operating piston 20, and may be of a hydraulic construction. In contrast, the adjusting device 17 of the sliding blade 11 is a fixing device 21 which has an eccentric 22 cooperating with the sliding blade 11. The eccentric 22 is arranged on a bearing bolt 23 which is screwed into a housing 25 of the internal-combustion engine by means of a first thread 24. The position of the eccentric 22 is fixed by a screw nut 26 which surrounds a second thread of the bearing bolt. On an area 27 facing the sliding blade 11, the eccentric 21 is provided with a receiving section 28 for a bearing section 29 of the above-mentioned sliding blade. The receiving section 28 has a U-shaped cross-section 30 in which the bearing section 29 engages by means of a corresponding end piece 31. The fixing device 21 or the eccentric 22 extends to the sliding blade 11 between the sprocket wheels 5, 6, the sliding blade 11 being connected there with the chain 4.

Opposite the bolt 14, the tensioning device 18 is applied to the free end 32 of the tensioner blade 10. Adjacent to this free end 32, a supporting part 33 of the tensioner blade 10 for the tensioning device 18 extends away from the chain 4.

Viewed in their longitudinal directions, the sliding blade 11 has a shape consisting of two curves 34 and 35 oriented in opposite directions, whereby the sliding blade 11 obtains an S-shape and is adapted in sections to the course of the chain drive 1. The tensioner blade 10 has an approximately mirror-inverted construction and carries out a comparable function. Viewed along their lengths, the sliding blade 11 and the tensioner blade 10 may have similar or identical courses.

At least the sliding blade 11 may consist of a plastic material and comprise a slide coating 38 and a support 39. In this case, the support 39 consists of a hard material and the slide coating 38 consists of a wear-resistant material. The above-mentioned German Patent Document DE 37 06 136 C1 contains more details in this respect. On the area 27 interacting with the fixing device 21 or the eccentric 22, the sliding blade 11 is provided with a coating 39 which, like the slide coating 36, consists of a wear-resistant plastic material and is held in position at the support 37.

Figure 3:
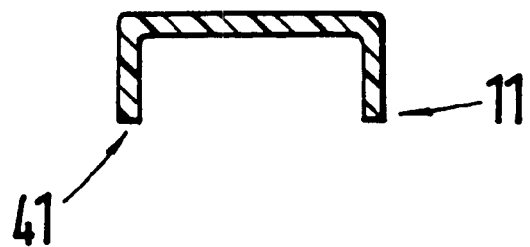
FIG. 3 is a sectional view according to Line III—III of FIG. 1.

The function of the sliding blade 11 and of the tensioner blade 10 is expanded in that these blades are provided with oil guiding devices 41 and 42 for oil thrown up in the chain moving direction KLR. The oil guiding devices 41 and 42, in sections, surround the upper sprocket wheel 5 and end in the proximity of the construction line 9, a relatively small space 43 remaining between the above-mentioned oil guiding devices. The oil guiding devices 41 and 42 have a U-shaped cross-section (see FIG. 3), which promotes the endeavored effect.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Chain drive for an internal-combustion engine, comprising:
    a chain;
    a tensioner blade engaging a loose side of said chain;
    a sliding blade engaging a load side of said chain;
    said tensioner blade and said sliding blade each being disposed in an articulated manner at a first end; and
    adjusting devices being applied to second ends of said tensioner blade and said sliding blade, respectively,
    wherein the adjusting device of the sliding blade is a fixing device, and
    wherein the fixing device comprises an eccentric which cooperates with the sliding blade.

2. Chain drive according to claim 1, wherein the adjusting device of the tensioner blade is a hydraulic tensioning device.

3. Chain drive according to claim 1, wherein, on an area facing the sliding blade, the eccentric has a receiving section for a bearing section of the sliding blade.

4. Chain drive according to claim 3, wherein the receiving section has a U-shaped cross-section in which the bearing section engages by way of a corresponding end piece.

5. Chain drive for an internal-combustion engine, comprising:
    a chain;
    a tensioner blade engaging a loose side of said chain;
    a sliding blade engaging a load side of said chain;
    said tensioner blade and said sliding blade each being disposed in an articulated manner at a first end; and
    adjusting devices being applied to second ends of said tensioner blade and said sliding blade, respectively,
    wherein said chain couples an upper sprocket wheel located on an upper shaft and a lower sprocket wheel located on a lower shaft, said tensioner blade and said sliding blade being disposed in an articulated manner at a location above the chain.

6. Chain drive according to claim 5, wherein a fixing device is applied to the sliding blade between the upper and lower sprocket wheels.

7. Chain drive according to claim 6, wherein the sliding blade engages the chain proximate the fixing device.

8. Chain drive according to claim 5, wherein a tensioning device is applied to a support part of the tensioner blade at a location proximate the lower sprocket wheel, said support part extending away from the chain.

9. Chain drive for an internal-combustion engine, comprising:
    a chain;
    a tensioner blade engaging a loose side of said chain;
    a sliding blade engaging a load side of said chain;
    said tensioner blade and said sliding blade each being disposed in an articulated manner at a first end; and
    adjusting devices being applied to second ends of said tensioner blade and said sliding blade, respectively,
    wherein each of said tensioner blade and said sliding blade have a shape comprising two oppositely-directed curves.

10. Chain drive according to claim 9, wherein the shape of the tensioner blade corresponds to the shape of the sliding blade over at least a substantial longitudinal length.

11. Chain drive according to claim 5, wherein at least one of said tensioner blade and said sliding blade is made of, a plastic material and has a wear-resistant slide coating and a support made of a relatively hard material.

12. Chain drive according to claim 11, wherein at least a portion of said sliding blade is provided with a coating made of a wear-resistant plastic material.

13. Chain drive according to claim 5, wherein at least one of said tensioner blade and said sliding blade is provided with an oil guiding device surrounding the chain adjacent to a sprocket wheel.

14. Chain drive according to claim 13 wherein the oil guiding device has a U-shaped cross-section.

15. Tensioning system for a chain drive system, of an internal-combustion engine, comprising:
    a chain coupling a driving sprocket wheel and a driven sprocket wheel;
    a first blade pivotably mounted at a proximal end and having a surface engaging a loose side of said chain;
    a second blade pivotably mounted at a proximal end and having a surface engaging a load side of said chain;
    a first adjusting device engaging said first blade proximate a distal end thereof; and
    a second adjusting device engaging said second blade proximate a distal end thereof
    wherein said second adjusting device comprises an eccentric.

16. Tensioning system according to claim 15, wherein said first adjusting device comprises a piston-cylinder unit which biases said first blade toward said chain.

17. A chain drive for an internal combustion engine comprising:
- a chain coupling a driving sprocket wheel and a driven sprocket wheel,
- a first blade pivotally mounted at a first pivot located outside a travel path of the chain at a side of said driving sprocket wheel which faces away from the driven sprocket wheel, said first blade in use extending from said first pivot and including a surface engaging a loose side of the chain intermediate the sprocket wheels,
- a second blade pivotally mounted at a second pivot located outside the travel path of the chain at said side of said driving sprocket wheel which faces away from the driven sprocket wheel, said second blade in use extending from said second pivot and including a surface engaging a load side of the chain intermediate the sprocket wheels,
- a first adjusting device engaging said first blade at a location spaced from the first pivot, and
- a second adjusting device engaging said second blade at a location spaced from the second pivot.

18. A chain drive according to claim 17, wherein said driving sprocket wheel is drivingly connected with an engine crankshaft, and wherein said driven shaft is a cam shaft.

19. A chain drive according to claim 17, wherein said first and second pivots are respective pivot bolts.

20. A chain drive according to claim 17, wherein said driving sprocket wheel is disposed above the driven sprocket wheel, and wherein said blades extend downwardly from their respective pivots.

21. A chain drive according to claim 18, wherein said driving sprocket wheel is disposed above the driven sprocket wheel, and wherein said blades extend downwardly from their respective pivots.

22. A chain drive for an internal combustion engine comprising:
- a chain coupling a driving sprocket wheel and a driven sprocket wheel,
- a first blade pivotally mounted at a first pivot, said first blade in use extending in a first direction from said first pivot and including a surface engaging a loose side of the chain intermediate the sprocket wheels,
- a second blade pivotally mounted at a second pivot, said second blade in use extending in said first direction from said second pivot and including a surface engaging a load side of the chain intermediate the sprocket wheels,
- a first adjusting device engaging said first blade at a location spaced from the first pivot, and
- a second adjusting device engaging said second blade at a location spaced from the second pivot.

23. A chain drive according to claim 22, wherein said driving sprocket wheel is drivingly connected with an engine crankshaft, and wherein said driven shaft is a cam shaft.

24. A chain drive according to claim 22, wherein said first and second pivots are respective pivot bolts.

25. A chain drive according to claim 22, wherein said driving sprocket wheel is disposed above the driven sprocket wheel, and wherein said blades extend downwardly from their respective pivots.

26. A chain drive according to claim 23, wherein said driving sprocket wheel is disposed above the driven sprocket wheel, and wherein said blades extend downwardly from their respective pivots.

* * * * *